United States Patent
Backes et al.

[11] Patent Number: 6,082,048
[45] Date of Patent: Jul. 4, 2000

[54] SEALING, TRIMMING OR GUIDING STRIPS

[75] Inventors: Heinz-Peter Backes, Wegberg; Heinz Andrzejewski, Viersen, both of Germany

[73] Assignee: Draftex Industries Limited, Edinburgh, United Kingdom

[21] Appl. No.: 09/171,331

[22] PCT Filed: Apr. 17, 1997

[86] PCT No.: PCT/GB97/01062

§ 371 Date: Oct. 15, 1998

§ 102(e) Date: Oct. 15, 1998

[87] PCT Pub. No.: WO97/39907

PCT Pub. Date: Oct. 30, 1997

[30] Foreign Application Priority Data

Apr. 25, 1996 [GB] United Kingdom .................... 9608477
Sep. 19, 1996 [GB] United Kingdom .................... 9619576

[51] Int. Cl.⁷ ...................................................... E05F 11/38
[52] U.S. Cl. ................................ 49/377; 49/440; 49/490.1
[58] Field of Search .......................... 49/377, 374, 490.1, 49/475.1, 440, 441, 489.1

[56] References Cited

U.S. PATENT DOCUMENTS

| | | | |
|---|---|---|---|
| 5,001,867 | 3/1991 | Dupuy | 49/37 X |
| 5,136,773 | 8/1992 | Mesnel et al. | 49/490.1 X |
| 5,147,105 | 9/1992 | Ono et al. | 49/490.1 X |
| 5,317,835 | 6/1994 | Dupuy et al. | 49/377 X |
| 5,343,609 | 9/1994 | McManus . | |
| 5,407,628 | 4/1995 | Nozaki et al. . | |
| 5,866,232 | 2/1999 | Gatzmanga | 49/490.1 X |

FOREIGN PATENT DOCUMENTS

| | | |
|---|---|---|
| 0 479 643 | 4/1992 | European Pat. Off. . |
| 0 628 439 | 12/1994 | European Pat. Off. . |
| 0 678 412 | 10/1995 | European Pat. Off. . |
| 0 684 158 | 11/1995 | European Pat. Off. . |
| 1 590 398 | 6/1981 | United Kingdom . |
| 2 273 734 | 6/1994 | United Kingdom . |
| 2 290 820 | 1/1996 | United Kingdom . |
| 2 294 284 | 4/1996 | United Kingdom . |
| 2 294 964 | 5/1996 | United Kingdom . |
| WO 95/34445 | 12/1995 | WIPO . |

Primary Examiner—Jerry Redman
Attorney, Agent, or Firm—Leydig, Voit & Mayer, Ltd.

[57] ABSTRACT

A sealing, trimming and guiding strip for the window of a motor vehicle body defines a first or main opening (6) for a vertically slidable window glass and a second, subsidiary, opening (8) for a fixed window glass. The strip (5) is of partially moulded and partially extruded construction. Over the region (ABC) extending around part of the main window opening (6), only the face of the strip facing outwardly of the vehicle is moulded. The inside face of the seal over this region is formed by extruded portions which are either attached to the moulded part or are held in juxtaposition with the moulded part by means of a rigid mounting channel forming part of the window frame. The cross piece (9) and the whole of the strip extending around the remainder of the subsidiary window opening (8) are entirely of moulded construction, and integrally moulded with the moulded part of the strip extending around the main window opening (6). The moulded part is moulded from a thermoplastic olefin (TPO) to present a pleasing appearance and with integrally moulded sharp corners. The extruded parts are extruded from EPDM to give good sealing properties.

17 Claims, 5 Drawing Sheets

SEALING, TRIMMING OR GUIDING STRIPS

BACKGROUND OF THE INVENTION

The invention relates to a sealing, trimming or guiding strip for a window frame in a motor vehicle body, comprising first strip means formed of one-piece moulded construction and extending along the length of the strip and defining a first longitudinally extending face intended to be on the outside of the vehicle in use, and second strip means extending longitudinally along the strip and attached to the first strip means to define the second, opposite, longitudinal face of the strip and intended to be on the inside of the vehicle in use, the strip incorporating extruded material.

Such a strip is shown in GB-A-2 272 721. This strip provides a so-called waist seal for placing along one of the rigid edges defining a generally horizontal open slot in a vehicle door, through which a movable window glass for the window carried by the door can be raised or lowered. The strip has a moulded portion for placing on the outside of the vehicle door and an extruded sealing part attached to the moulded part and facing inwardly of the door.

SUMMARY OF THE INVENTION

The present invention is concerned with the provision of a seal for extending around the whole of the frame of the window opening, not merely along the waist of the door.

According to the invention, therefore, the first strip means is in the form of a continuous closed loop and having at least one sharp-angled corner matching a sharp-angled corner of the window frame, and in that the extruded material defines at least first and second separate parts each extending along a respective part, only, of the length of the strip, the two separate parts being of respectively different shapes and being overlapped by at least the first strip means.

Sealing, trimming or guiding strips for vehicle window frames will now be described, by way of example only, with reference to the accompanying diagrammatic drawings in which:

DETAILED DESCRIPTION OF THE DRAWINGS

Figure 1:
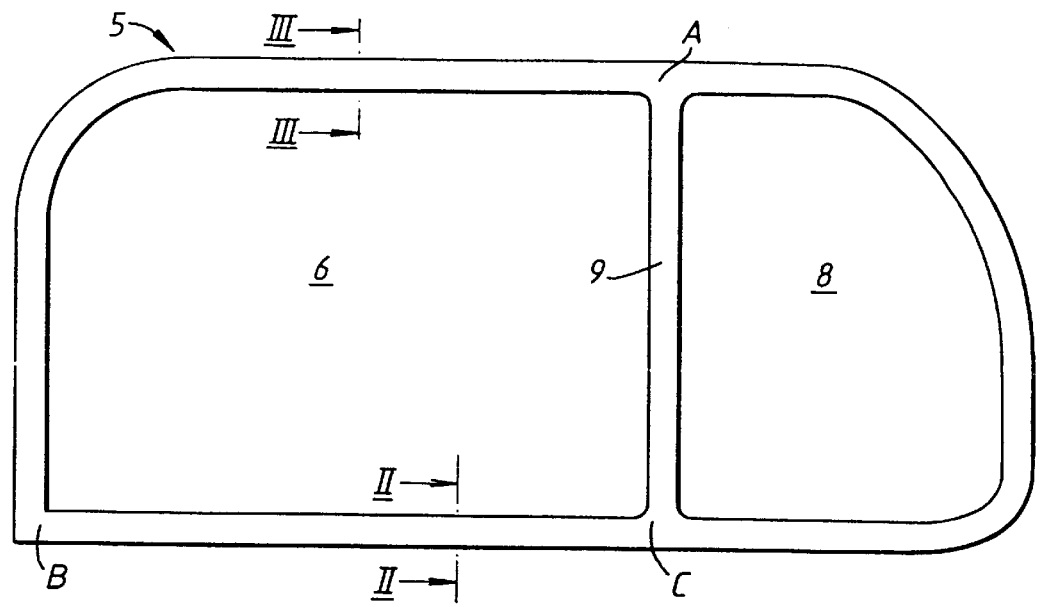
FIG. 1 is a side view of one of the strips.

The sealing, trimming or guiding strip indicated generally at 5 in FIG. 1 is for use in the window opening of the upper part of a vehicle door. In particular, the strip 5 may be used for the window opening in the rear door of a vehicle. The strip thus has a first part surrounding a window opening 6 in which a window glass (not shown) can move in a vertical direction, being raised from and lowered into the lower part of the vehicle door. The second part of the strip 5 defines an opening 8 in which is received a fixed window pane (forming the so-called "quarter light" of the rear door). A cross piece 9 is common to both parts of the seal. The strip 5 around the window opening 6 thus defines channels along the vertical sides and the top of the opening 6 and a seal extending alongside a gap which runs along the horizontal part, or waist. The window glass passes through this gap as it rises from or is lowered into the lower part of the door. Around the whole of the opening 8, the strip defines a channel for receiving the fixed piece of window glass. FIG. 1 views the strip 5 from outside the vehicle.

In accordance with a feature of the invention, the strip 5 is partially of moulded construction and partially of extruded construction. Thus, the whole of the strip 5 surrounding the opening 8, including the cross piece 9, is produced by a moulding operation, and is integrally moulded with the part of the strip defining the face of the remainder of the strip on the outside of the vehicle, that is, the face of the strip is extending around the opening 6 from the point A through the point B to the point C. The moulded part is produced in a single moulding operation from thermoplastic olefin material (TPO) and is thus produced in a single piece. Thus, the necessary sharp corners at A,B and C are easily produced by the moulding operation. TPO is an advantageous material to use for the moulding operation because it has a good appearance, is easily moulded (the mould itself requires much less frequent cleaning than when using other materials such as rubber) and it can be easily produced in different colours.

Figure 2:
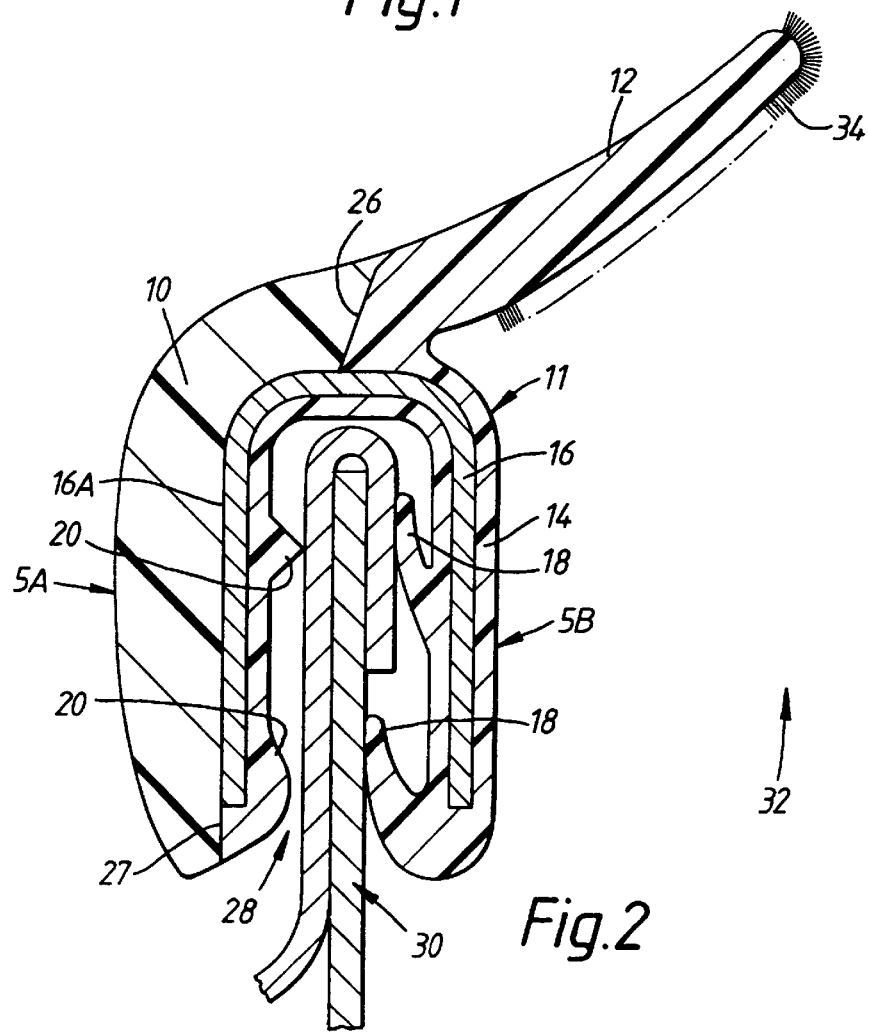
FIG. 2 is a cross-section on the line II—II of FIG. 1.

FIG. 2 shows how, over the region BC, the outer face 5A of the strip is defined by the moulded TPO material 10 while the inner face of the strip (that is, the face 5B of the strip on the inside of the vehicle) is formed by the face of a channel-shaped structure 11 carrying a lip 12. The channel-shaped structure 11 is made of extruded EPDM material 14 in which is partially embedded a channel-shaped metal reinforcing carrier 16. The material 14 is integrally extruded with the lip 12.

The metal carrier is made of channel-shaped metal, slotted or slitted to improve its flexibility. For example, it may comprise inverted U-shaped elements arranged next to each other to define the channel and either integrally connected together by short flexible connecting links or perhaps entirely disconnected from each other. Looped wire may be used instead. Other forms of carrier can be used. Along one face 16A of the carrier, it is not covered by the extruded EPDM material 14.

The material 14 is extruded to provide integral lips 18 and shoulders 20 which are directed towards each other across the width of the channel.

The carrier 16 may be incorporated in the extruded EPDM material 14 by means of a cross-head extruder.

FIG. 2 shows how the structure 10 is shaped to match the shape of the moulded TPO material 10. The structure 11 is secured to the TPO material 10 using a suitable adhesive. This adhesive is applied between the TPO material 10 and the lip 12 along a surface 26, between the TPO material 10 and the surface 16A of the carrier 16 where it is not covered by the extruded EPM material 14, and along a further surface 27.

When the strip 5 is mounted in position on the vehicle body, the channel 28 of the structure 11 embraces a supporting flange 30 running along the waist of the door alongside the gap 32 through which the window glass is raised and lowered. The channel 28 grips the flange 30 and thus supports the strip 5 along the waist. The gripping process is assisted by the lip 18 and the shoulders 20,22. Advantageously, the lips 18 can be co-extruded so as to be relatively soft, compared with the rest of the extruded material 14, to increase their frictional grip on the flange. The channel 28 thus supports the structure 11 so that the lip 12 is positioned alongside the gap 32 through which the glass pane moves. The lip 12 preferably has a flocked surface 34 for making a good low friction seal on the outer face of the glass.

A suitable seal (not shown) is preferably provided to run along the waist of the door on the opposite side of the gap 32 so as to seal against the inner surface of the glass.

It will be appreciated that the TPO material 10 need not be adhesively secured to the extruded structure but may be directly moulded thereto.

Figure 3:
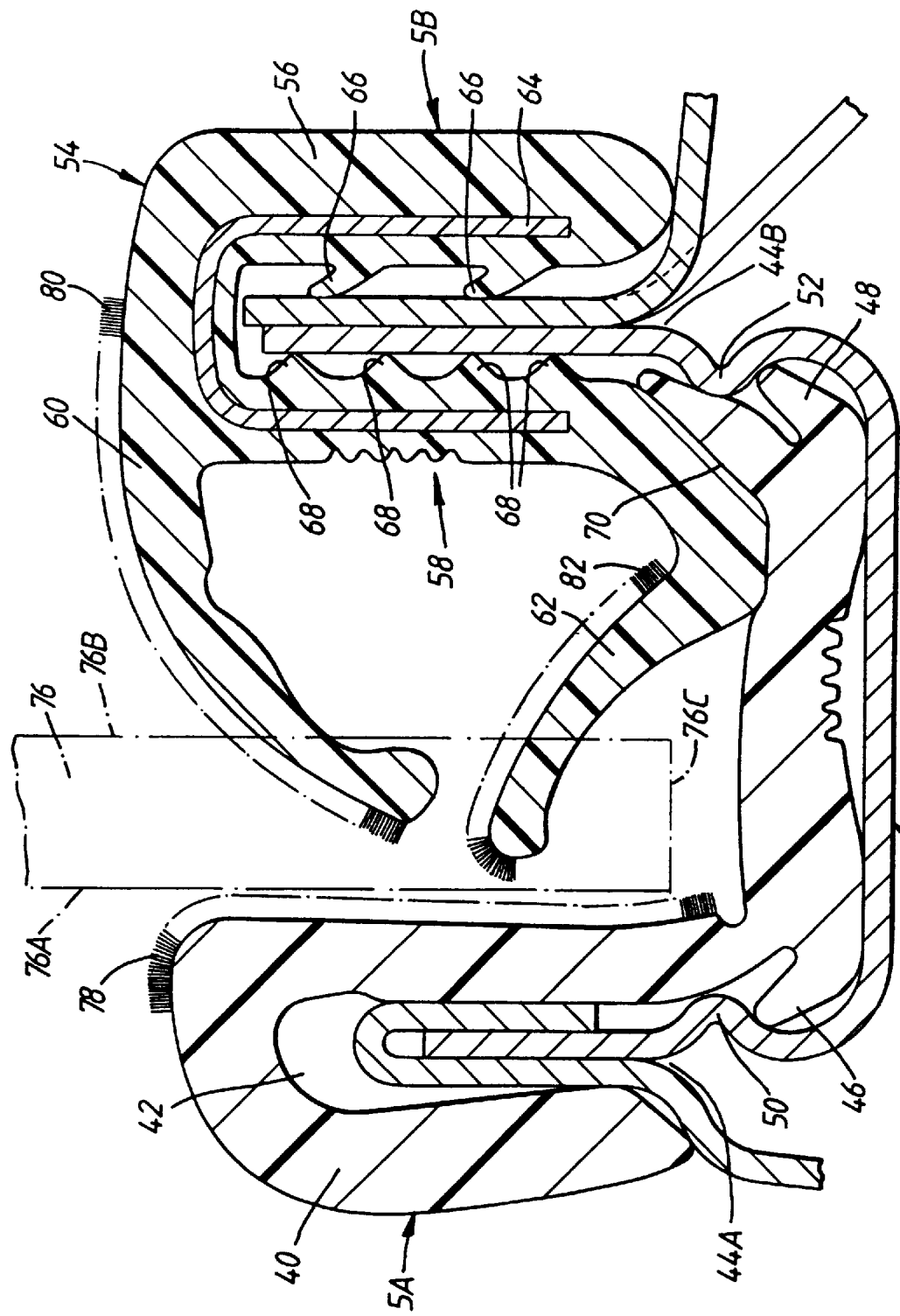
FIG. 3 is a cross-section on the line III—III of FIG. 1.

FIG. 3 shows the form which the strip 5 takes over the region between points A and B in FIG. 1. Over this region, the moulded TPO material defining the outer face 5A of the strip is shown at 40. The moulded material comprises a generally L-shaped portion with one limb of the L folded over on itself to define a slot 42. Over the length AB, the strip 5 is mounted within a metal mounting channel 44 forming part of the window frame for the opening 6 (FIG. 1). The side walls of the channel 44 define flanges 44A and 44B where the channel is secured (as by welding) to the outer and inner door panels. The moulded part 40 of the seal 5 is mounted in the channel 44 so that its slot 42 is engaged over the flange 44A of the channel 44. The other limb of the "L" lies in the base of the channel 44 and is provided with lips 46 and 48 which engage under inwardly directed shoulders 50 and 52 of the channel 44.

In addition, over the region AB the strip 5 incorporates an extruded structure 54. The structure 54 is extruded from EPDM material 56 to define a channel-shaped part 58 and two lips 60 and 62. The channel-shaped part 58 incorporates a metal carrier 64 which may be of similar construction to the metal carrier 16 of FIG. 2. The extruded EPDM material 56 defines integral lips 66 and shoulders 68 corresponding to the lips 18 and the shoulders 20 of FIG. 2. Along a surface 70, the extruded EPDM material is profiled to match the profile of the lower limb of the moulded part 40.

As shown, the structure 54 is mounted on the flange 44B, the channel-shaped part 54 firmly gripping the flange 44B.

In this way, the moulded part 40 and the extruded structure 54 together define opposite walls of a glass run channel 72 in which the window glass 76 is positioned. The outer face 76A of the glass 76 makes sealing contact against a flocked surface 78 on the moulded part 40. The inner face 76B of the window glass 76 makes contact with a flocked surface 80 on the lip 60. Lip 62 has a flocked surface 82 which makes sealing contact with the edge 76C of the glass 76.

The moulded part 40 and the extruded structure 54 can be adhesively secured to each other along the line 70. However, this is not necessary because the two parts are held in the correct position relative to each other by their respective engagement with the flanges 44A and 44B.

The strip 5 is thus advantageous because it uses a moulded construction, made from TPO, for the outwardly facing surface of the strip, producing a pleasing appearance and a construction in which the sharp corners in the seal can be produced integrally during the moulding operation. The possibility of slight change in colouration at the sharp corners, which can occur when extruded lengths of sealing strip are connected together at sharp corners by separately moulded inserts, is thus avoided. In addition, the use of the extruded structures on the inside face of part of the seal 5 ensures very effective sealing against the glass surface, TPO not being so effective as sealing material.

In the foregoing description, it will be appreciated that the moulded TPO sections may be directly moulded onto the extruded parts and need not be secured by adhesive.

Figure 4:
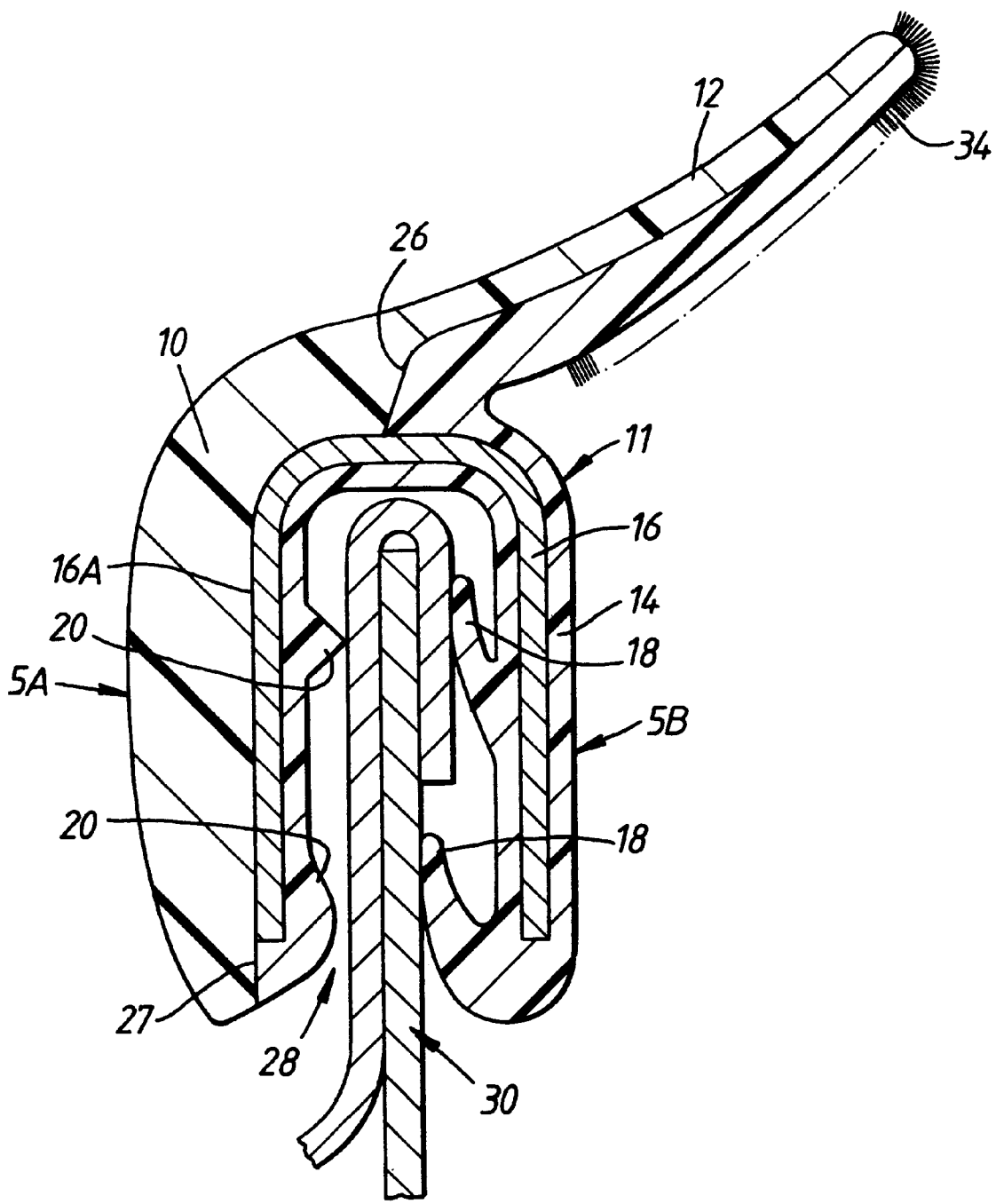
FIG. 4 is a view corresponding to FIG. 2 showing a modified version of one of the strips.

Referring to the modified strip of FIG. 4, the TPO moulded part 10 is formed in a different shape and extends along the lip 12 as shown.

The TPO 10 is directly moulded onto the extruded part 11. It will be appreciated that the TPO 10 need not be directly moulded onto the extruded part 11 but may be adhesively secured thereto using a suitable adhesive.

Figure 5:
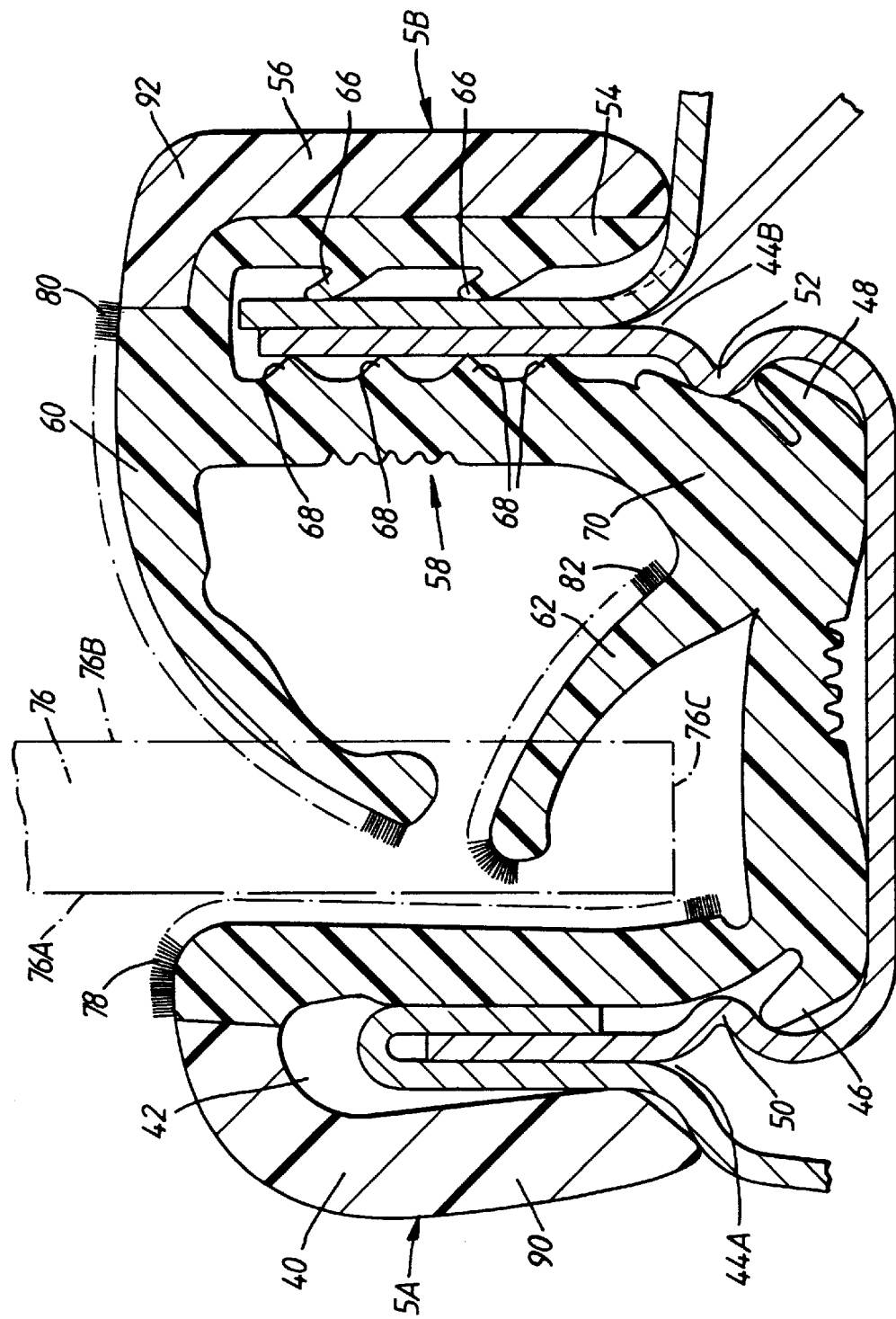
FIG. 5 is a view corresponding to FIG. 3 showing a modified version of one of the strips.

Referring to the modified strip of FIG. 5, the extruded part 58 is now generally channel-shaped. The extruded part 58 carries a first TPO moulded section 90 (shown on the left hand side of FIG. 5) defining the outer face 5A of the strip as shown in FIG. 5. Additionally, a second TPO moulded section 92 is caried on the right hand side of FIG. 5 defining the face 5B of the strip.

The TPO moulded sections 90,92 are directly moulded onto the extruded part 58. However, it will be appreciated that the TPO sections 90,92 need not be directly moulded onto the extruded part 58 but may be adhesively secured thereto.

In the modified strip of FIG. 5, the channel-shaped carrier 64 is omitted. However, it will be appreciated that a carrier may be incorporated if desired.

The modified strip of FIG. 5 is thus advantageous because it uses a moulded TPO construction for the outwardly and inwardly facing surface of the strip, producing a pleasing appearance on the exterior and interior of the vehicle.

Figure 6:
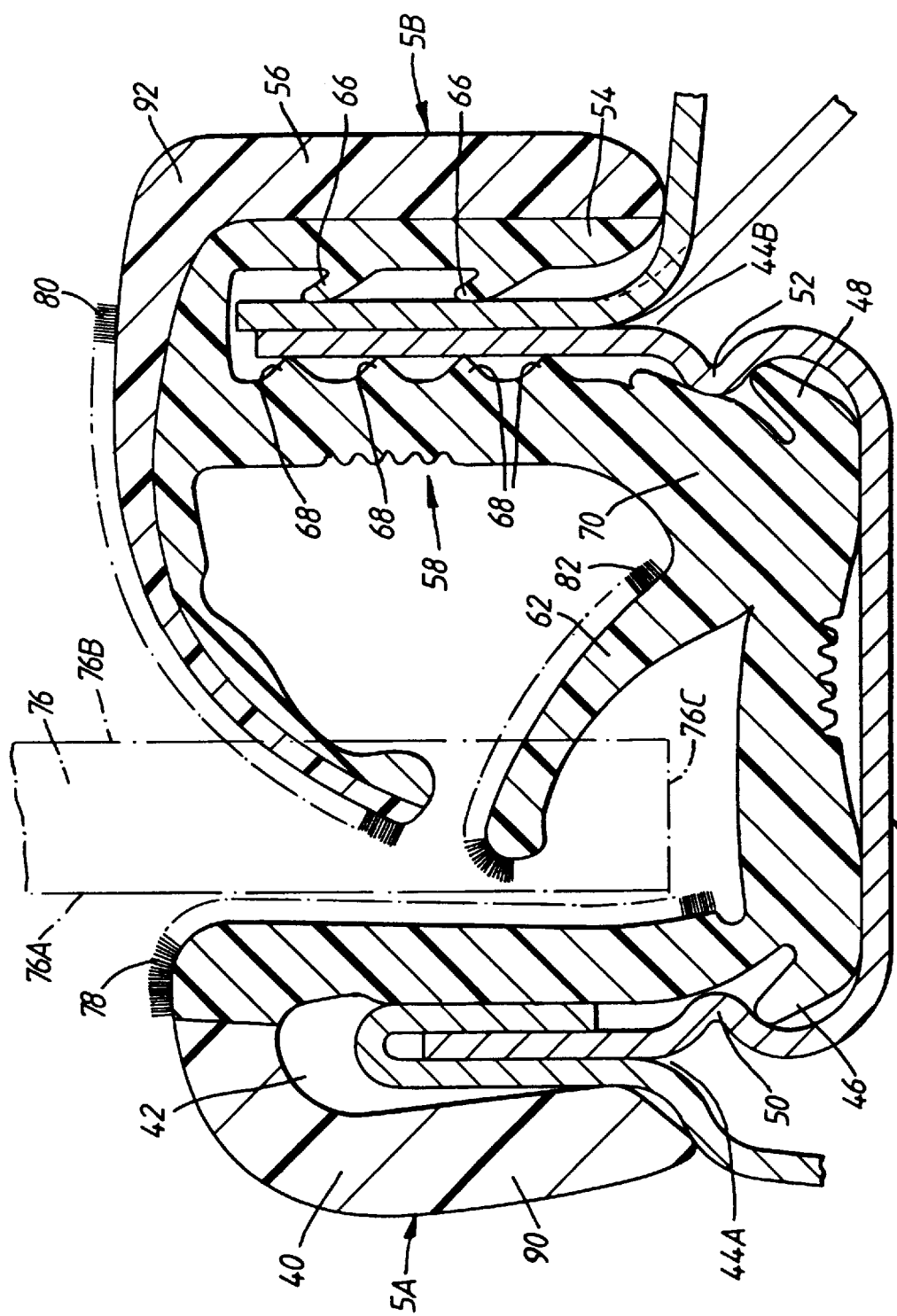
FIG. 6 is a view coresponding to FIG. 5 showing a further modified version of one of the strips.

FIG. 6 shows a further modified strip in which the second TPO section 92 of FIG. 5 is extended along the uppermost surface of the lip 60. This TPO section 92 is directly moulded onto the extruded part 58. However, it will be appreciated that the TPO section 92 may be adhesively secured to the extruded part 58.

In the modified strip of FIG. 6 the carrier 64 is omitted. However a suitable carrier may be incorporated if required.

The TPO section 92 again provides a pleasing appearance on the interior of the vehicle.

What is claimed is:

1. A longitudinally extending strip for performing at least one of sealing, trimming and guiding functions in a window frame in a motor vehicle body, the window frame defining a window opening between an exterior and interior of the vehicle body, comprising first strip means formed of one-piece molded construction and extending along the longitudinal extension of the strip and defining a first longitudinally extending face intended to be on the exterior of the vehicle body in use, and second strip means extending longitudinally along the strip and attached to the first strip means to define a second, opposite, longitudinal face of the strip and intended to be on the interior of the vehicle body in use, the strip incorporating extruded material, the first strip means being formed as one piece extending in a continuous closed first loop with which the first longitudinally extending face is co-extensive, the continuous first loop having at least one sharp-angled corner matching a sharp-angled corner of the window frame, and the extruded material defining at least first and second separate parts each extending along a respective part, only, of the longitudinal extension of the strip, the two separate parts being of respectively different shapes and being overlapped by at least the first strip means;

the strip forming a second loop integral with the first loop, at least part of the length of the second loop being common to a corresponding part of the length of the first loop, the second loop forming a frame for a second window, the second loop being molded integrally with the first strip means and being devoid of the second strip means and the extruded material.

2. A strip according to claim 1, in which both strip means are of one-piece molded construction, and the extruded material is between the two strip means with the first and second separate parts of the extruded material being joined together by both the first strip means and the second strip means.

3. A strip according to claim 2, in which the second separate part of the extruded material defines a window guiding channel.

4. A strip according to claim 3, in which the second part of the extruded material defines at least one lip extending partway towards the first strip means across the window guiding channel.

5. A strip according to claim 1, in which the second strip means is formed of the extruded material.

6. A strip according to claim 5, in which the second separate part of the extruded material is arranged together with the first strip means to define a window guiding channel.

7. A strip according to claim 6, in which the second separate part of the extruded material is held adjacent to the first strip means where they together define the window guiding channel, the second separate part and the first strip means being mounted on respective generally parallel supports but are not otherwise attached to each other there.

8. A strip according to claim 7, in which the two supports are opposite side walls of a rigid channel having a base, the second separate part of the extruded material and the first strip means respectively embracing the side walls and at least one of them also extending along the base of the channel.

9. A strip according to claim 1, in which along at least a portion of the continuous loop, a metal reinforcement is at least partially embedded in the extruded material.

10. A strip according to claim 9, in which the metal reinforcement defines a channel for gripping a mounting support, and the first strip means is secured to an outside wall surface of that channel.

11. A strip according to claim 10, in which the material of the second strip means defining the channel for gripping the mounting support also defines a lip extending away from an outside wall surface of that channel.

12. A strip according to claim 1, in which along at least a portion of the continuous loop said strip means of the molded construction is adhesively secured to the extruded material.

13. A strip according to claim 1, in which along at least a portion of the continuous loop said strip means of the molded construction is molded directly onto the extruded material.

14. A strip according to claim 1, in which the second strip means does not extend around the whole of the closed loop, the remaining part of the loop comprising only the first strip means.

15. A strip according to claim 1, in which the second loop defines a continuous channel for receiving a fixed window glass for the second window.

16. A strip according to claim 1, in which the molded material is a thermoplastic olefin.

17. A strip according to claim 1, in which the extruded material is EPDM.

* * * * *